(12) United States Patent
Antchak et al.

(10) Patent No.: US 8,863,925 B2
(45) Date of Patent: Oct. 21, 2014

(54) DECOUPLER WITH INTEGRATED TORSIONAL VIBRATION DAMPER

(75) Inventors: John R. Antchak, Aurora (CA); Jun Xu, Woodbridge (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 13/805,499

(22) PCT Filed: Jun. 23, 2011

(86) PCT No.: PCT/CA2011/000749
§ 371 (c)(1),
(2), (4) Date: Dec. 19, 2012

(87) PCT Pub. No.: WO2011/160215
PCT Pub. Date: Dec. 29, 2011

(65) Prior Publication Data
US 2013/0098733 A1   Apr. 25, 2013

Related U.S. Application Data

(60) Provisional application No. 61/358,576, filed on Jun. 25, 2010.

(51) Int. Cl.
*F16D 41/20* (2006.01)
*F16D 13/76* (2006.01)
*F16D 7/02* (2006.01)
*B60K 25/00* (2006.01)
*F16H 55/36* (2006.01)

(52) U.S. Cl.
CPC .............. *F16D 41/206* (2013.01); *F16D 13/76* (2013.01); *F16H 2055/366* (2013.01); *F16H 55/36* (2013.01); *F16D 7/022* (2013.01); *B60K 25/00* (2013.01)
USPC ...................................... 192/41 S; 192/110 B

(58) Field of Classification Search
USPC ................... 192/81 C, 41 S, 55.61
See application file for complete search history.

(56) References Cited

U.S. PATENT DOCUMENTS

| 773,320 A | 10/1904 | Haase |
| 2,396,985 A | 3/1946 | Burrus |
| 2,551,739 A | 5/1951 | Harlan |
| 2,633,953 A | 4/1953 | Gorske |

(Continued)

FOREIGN PATENT DOCUMENTS

| WO | WO-2005057037 A1 | 6/2005 |
| WO | WO-2010048732 A1 | 5/2010 |
| WO | WO-2010099605 A1 | 9/2010 |

OTHER PUBLICATIONS

International Search Report and Written Opinion for PCT/CA2011/000749, mailed Sep. 7, 2011; ISA/CA.

*Primary Examiner* — Rodney H Bonck
(74) *Attorney, Agent, or Firm* — Harness, Dickey & Pierce, P.L.C.

(57) ABSTRACT

A decoupler assembly with an input hub, an output member, and a one-way clutch. In one form, the decoupler assembly includes an annular bearing mount with a needle bearing disposed between the bearing mount and the input hub to support the output member for rotation on the input hub. In another form the decoupler assembly further comprises a torsional vibration damper that is received within an internal cavity that is bounded on opposite axial ends by the output member and a cover that is coupled to the output member.

16 Claims, 13 Drawing Sheets

(56) References Cited

U.S. PATENT DOCUMENTS

| | | |
|---|---|---|
| 2,794,524 A | 6/1957 | Sacchini |
| 2,829,748 A | 4/1958 | Sacchini et al. |
| 2,866,349 A | 12/1958 | Heckenthorn |
| 2,885,896 A | 5/1959 | Hungerford, Jr. et al. |
| 2,968,380 A | 1/1961 | Sacchini |
| RE25,229 E | 8/1962 | Sacchini |
| 3,059,493 A | 10/1962 | Wolfram |
| 3,242,696 A | 3/1966 | Kaplan |
| 3,298,486 A | 1/1967 | Perryman |
| 3,618,730 A | 11/1971 | Mould, III |
| 4,460,076 A | 7/1984 | Yamada |
| 5,139,463 A | 8/1992 | Bytzek et al. |
| 5,140,868 A * | 8/1992 | Mizuno et al. ............... 74/574.4 |
| 5,156,573 A | 10/1992 | Bytzek et al. |
| 5,437,205 A | 8/1995 | Tseng |
| 5,598,913 A | 2/1997 | Monahan et al. |
| 5,722,909 A | 3/1998 | Thomey |
| 5,879,254 A | 3/1999 | Tanaka |
| 6,044,943 A * | 4/2000 | Bytzek et al. ............... 192/41 R |
| 6,083,130 A * | 7/2000 | Mevissen et al. ............... 474/70 |
| 6,089,204 A * | 7/2000 | Shaffer ....................... 74/574.4 |
| 6,161,512 A * | 12/2000 | Beels Van Heemstede . 74/574.4 |
| 6,394,247 B1 | 5/2002 | Monahan et al. |
| 6,394,248 B1 | 5/2002 | Monahan et al. |
| 6,675,759 B2 * | 1/2004 | Johnson et al. ............ 123/192.1 |
| 6,676,548 B2 | 1/2004 | Fujiwara |
| 6,761,656 B2 | 7/2004 | King et al. |
| 7,052,420 B2 | 5/2006 | King et al. |
| 7,070,033 B2 | 7/2006 | Jansen et al. |
| 7,153,227 B2 | 12/2006 | Dell et al. |
| 7,207,910 B2 | 4/2007 | Dell et al. |
| 7,591,357 B2 | 9/2009 | Antchak et al. |
| 7,618,337 B2 | 11/2009 | Jansen et al. |
| 7,624,852 B2 | 12/2009 | Mevissen et al. |
| 7,712,592 B2 | 5/2010 | Jansen et al. |
| 2006/0144664 A1 | 7/2006 | Antchak et al. |
| 2007/0037644 A1* | 2/2007 | Mevissen et al. ............... 474/70 |
| 2007/0066426 A1* | 3/2007 | Kamdem et al. ............... 474/94 |
| 2008/0194339 A1 | 8/2008 | Antchak et al. |
| 2008/0318715 A1* | 12/2008 | Pflug et al. .................... 474/100 |
| 2009/0176583 A1 | 7/2009 | Dell et al. |
| 2009/0255368 A1* | 10/2009 | Kiener et al. ................ 74/574.4 |
| 2011/0315502 A1* | 12/2011 | Antchak et al. ................ 192/75 |

* cited by examiner

Fig. 11

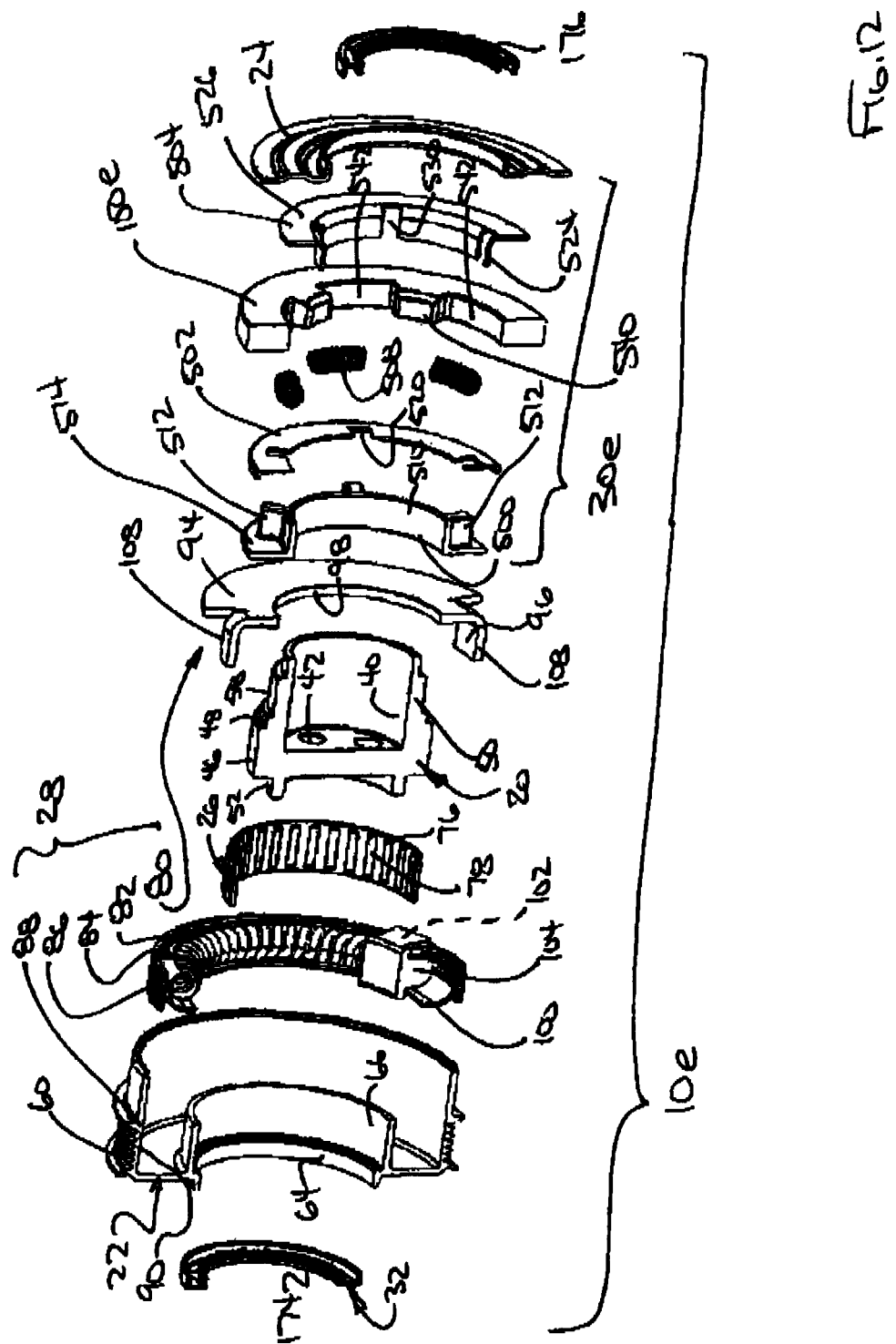

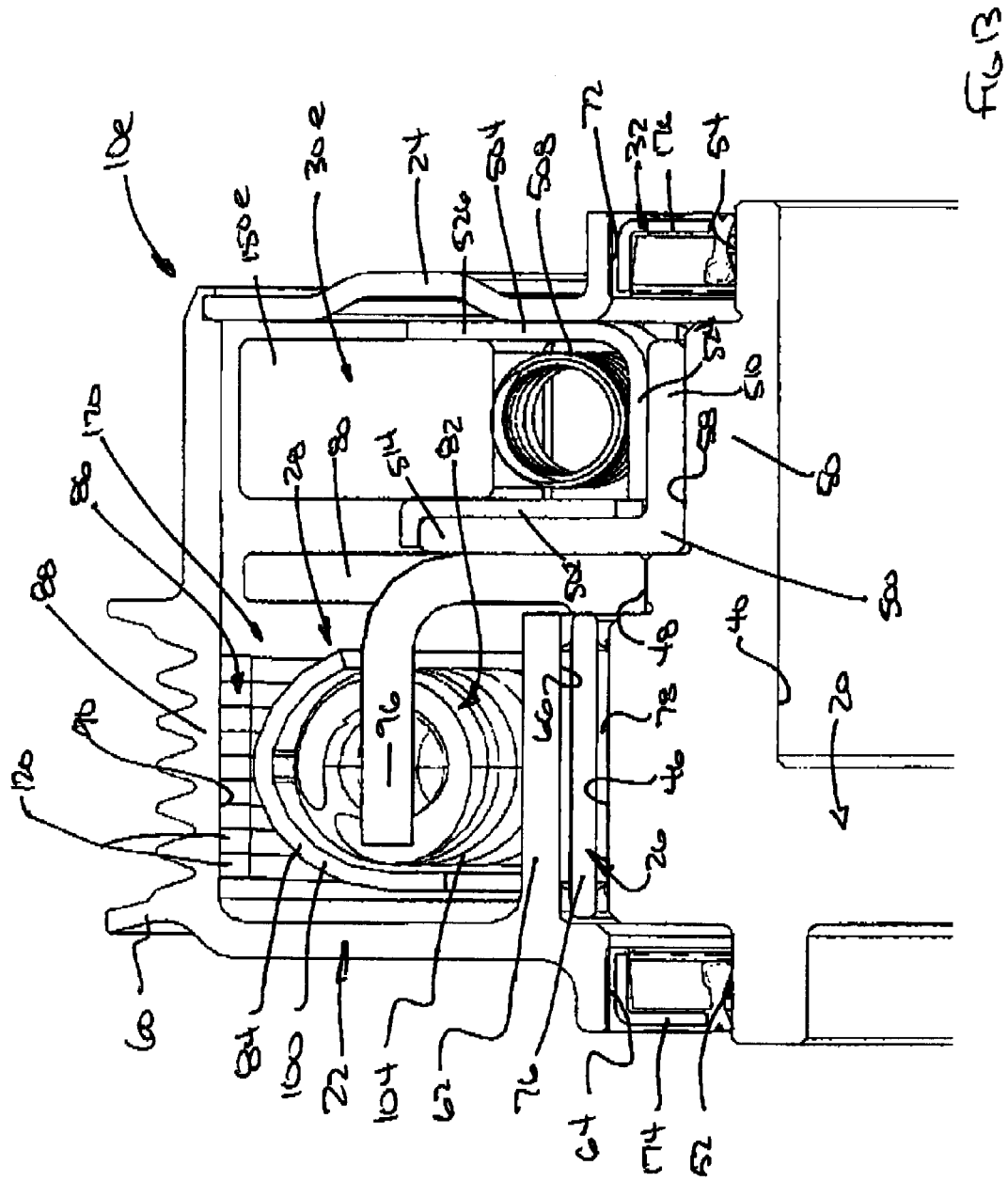

DECOUPLER WITH INTEGRATED TORSIONAL VIBRATION DAMPER

CROSS-REFERENCE TO RELATED APPLICATIONS

This application is a 371 U.S. National Stage of International Application No. PCT/CA2011/000749, filed on Jun. 23, 2011, which claims priority to U.S. Provisional Application No. 61/358,576, filed on Jun. 25, 2010. The contents of the above applications are incorporated herein by reference in their entirety.

The present disclosure generally relates to a decoupler with an integrated torsional vibration damper.

Various patents and patent applications disclose the use of a decoupler attached to an engine crankshaft; the decoupler can be configured to provide torsional resilience between the crankshaft and a crankshaft pulley, which transmits rotary power from the crankshaft to the belt of a front engine accessory drive, and/or overrunning capabilities that would permit the crankshaft pulley to over-run the crankshaft. Examples of such disclosures include U.S. Patent Application Publication Nos. 2006/0144664 and 2007/0037644. While such decouplers are well suited for their intended purpose, we have noted that the addition of a decoupler with a torsional vibration damper can be difficult to package into a vehicle in some instances due to considerations for the axial length and/or the diameter of the decoupler/torsional vibration damper assembly.

Accordingly, there remains a need in the art for an improved decoupler having an integrated torsional vibration damper that can be relatively more compact as compared to previously proposed decoupler and torsional vibration damper assemblies.

SUMMARY

This section provides a general summary of the disclosure, and is not a comprehensive disclosure of its full scope or all of its features.

In one form the present teachings provide a decoupler assembly with an input hub, an output member, a one-way clutch, an annular bearing mount and a needle bearing. The one-way clutch has a clutch input member, a clutch output structure, at least one damping spring, a carrier, and a clutch spring. The clutch input member is coupled to the input hub for rotation therewith. The clutch output structure is coupled to the output member and has a clutch surface. The at least one damping spring abuts the clutch input member and the carrier to transmit rotary power therebetween. The clutch spring is formed of wire. The clutch spring has an end that is fixedly coupled to the carrier and a plurality of helical coils that are configured to engage the clutch surface to transmit rotary power input to the clutch spring from the carrier to the clutch output structure. The annular bearing mount is coupled to at least one of the output member and the clutch output structure. The needle bearing is received between the input hub and the annular bearing mount.

In another form the present teachings provide a decoupler assembly with an input hub, an output member, a one-way clutch and a torsional vibration damper. The output member is rotatably mounted on the input hub. The one-way clutch has a clutch input member, a clutch output structure, at least one damping spring, a carrier, and a clutch spring. The clutch input member is coupled to the input hub for rotation therewith. The clutch output structure is coupled to the output member and has a clutch surface. The at least one damping spring abuts the clutch input member and the carrier to transmit rotary power therebetween. The clutch spring is formed of wire. The clutch spring has an end that is fixedly coupled to the carrier and a plurality of helical coils that are configured to engage the clutch surface to transmit rotary power input to the clutch spring from the carrier to the clutch output structure. The torsional vibration damper is mounted on the input hub and is disposed within an internal cavity that is bounded on opposite axial ends by the output member and a cover that is coupled to the output member.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 11 is a longitudinal section view of a portion of the fifth decoupler assembly of FIG. 10;

FIG. 12 is an exploded longitudinally sectioned perspective view of a sixth decoupler assembly constructed in accordance with the teachings of the present disclosure;

FIG. 13 is a longitudinal section view of a portion of the sixth decoupler assembly of FIG. 12.

Corresponding reference numerals indicate corresponding parts throughout the several views of the drawings.

DETAILED DESCRIPTION OF THE VARIOUS EMBODIMENTS

Figure 1:
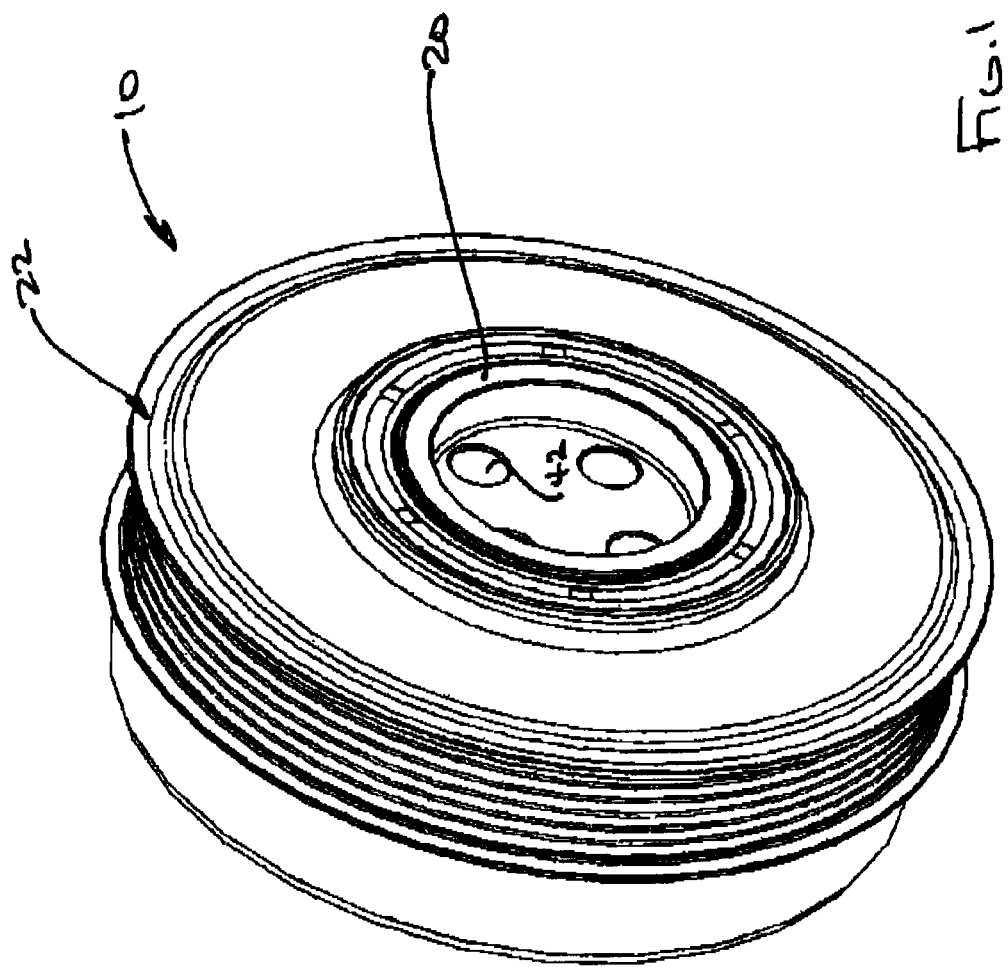
FIG. 1 is a perspective view of a first decoupler assembly constructed in accordance with the teachings of the present disclosure.
Figure 2:
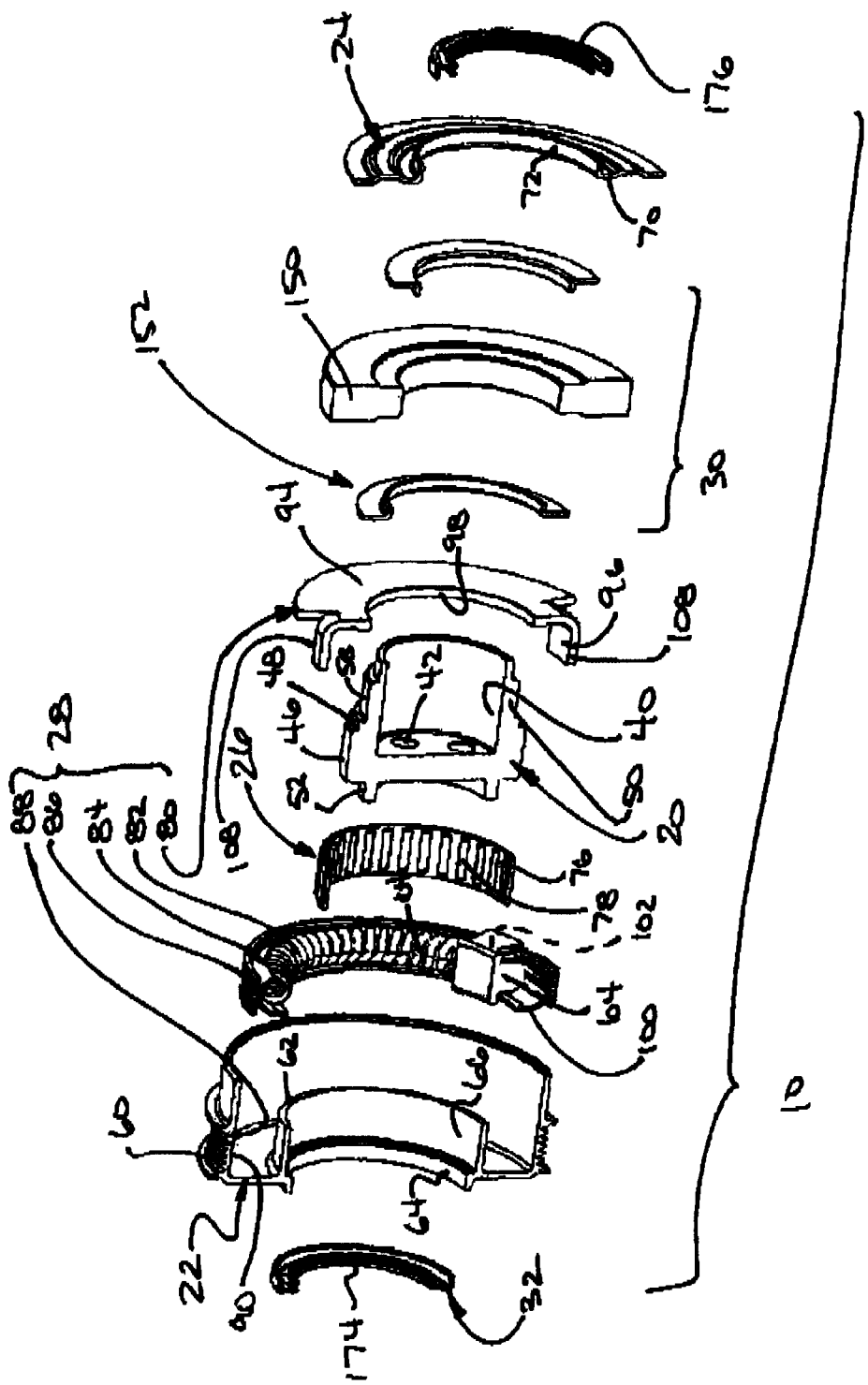
FIG. 2 is an exploded longitudinally sectioned perspective view of the first decoupler assembly of FIG. 1.
Figure 3:
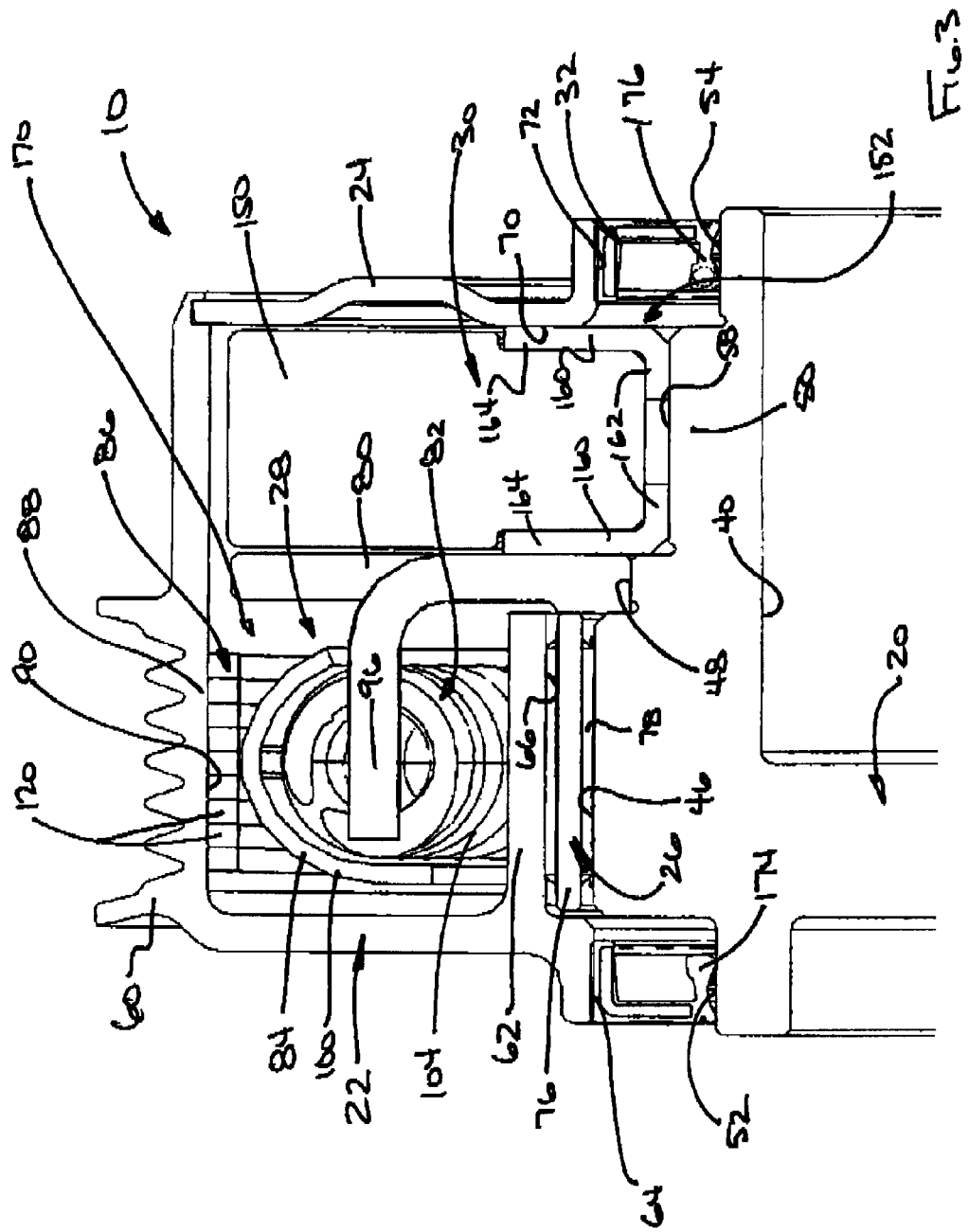
FIG. 3 is a longitudinal section view of a portion of the first decoupler assembly of FIG. 1.

With reference to FIGS. 1 through 3, a first decoupler assembly constructed in accordance with the teachings of the present disclosure is generally indicated by reference numeral 10. The first decoupler assembly 10 can comprise an input hub 20, an output member 22, a cover 24, a bearing 26, a one-way clutch 28, a torsional vibration damper 30, and a seal system 32.

The input hub 20 can be configured to be received over a driving shaft (not shown) and can comprise any desired means to non-rotatably couple the input hub 20 to the driving shaft. In the particular example provided, the input hub 20 comprises a pilot bore 40, which is sized to closely match a diameter of a pilot shaft portion (not shown) of the driving shaft to thereby align a rotational axis of the first decoupler assembly 10 to a rotational axis of the driving shaft, and a plurality of threaded fasteners (not shown) are received through bolt-holes 42 in the input hub 20 and threadably engaged to corresponding holes (not shown) in the driving shaft. The input hub 20 can comprise an inner bearing surface 46, a clutch mount 48, a damper mount 50, and first and second inner seal surfaces 52 and 54, respectively.

The inner bearing surface 46 can comprise a circumferentially extending surface that is configured to abut the bearing 26. If desired, the inner bearing surface 46 can be hardened in a suitable manner. The clutch mount 48 can comprise any means for transmitting rotary power to an input portion of the one-way clutch 28. In the example provided, the clutch mount 48 comprises an annular shoulder that is disposed radially between the inner bearing surface 46 and the damper mount 50. It will be appreciated, however, that the clutch mount 48 could be formed differently and need not have a cylindrically-shaped outer surface (e.g., the outer surface of the clutch mount 48 could be shaped with an outer surface that with a non-circular cross-sectional shape, such as a square or hexagonal cross-sectional shape, to inhibit relative rotation between the input hub 20 and the input portion of the one-way clutch 28. The damper mount 50 can be configured to mount the torsional vibration damper 30 to the input hub 20 in a desired manner that can be tailored to the particular type of torsion vibration damper that is employed. In the example provided, the damper mount 50 comprises an annular shoulder with a cylindrically-shaped damper mount surface 58. The first and second inner seal surfaces 52 and 54 can comprise cylindrically-shaped seal surfaces that extend axially away from the inner bearing surface 46 and the damper mount 50, respectively. The first inner seal surface 52 can be disposed on an annular shoulder or rib that can be disposed radially inwardly of the inner bearing surface 46. The second inner seal surface 54 can be disposed on an annular shoulder or rib that can be disposed radially inwardly of the damper mount surface 58.

The output member 22 can comprise an output structure 60, an annular bearing flange 62 and a first outer seal surface 64. The output structure 60 can be configured to output rotary power from the first decoupler assembly and as will be appreciated by those of skill in the art, its shape can be tailored to the particular type of system into which the first decoupler assembly is integrated. For example, the output structure 60 could be configured as a roller or could comprise a plurality of circumferentially spaced-apart teeth for engaging a gear, a chain or a toothed belt. In the particular example provided, the output structure 60 is a pulley sheave and can be configured to engage an associated belt, such as a poly-V belt. The annular bearing flange 62 can be coupled to the output structure 60 for rotation therewith and can define an outer bearing surface 66 that can be disposed radially outwardly from the inner bearing surface 46. The outer bearing surface 66 can be hardened. The first outer seal surface 64 can be disposed on an annular shoulder or rib that can extend axially from the output structure 60 concentric with the inner bearing surface 46.

The cover 24 can be coupled to the output structure 60 and can extend radially inwardly therefrom toward the input hub 20. The cover 24 can define a thrust surface 70, which can be configured to abut the torsional vibration damper 30 to inhibit movement of all or a portion of the torsional vibration damper 30 in an axial direction away from the one-way clutch 28, and a second outer seal surface 72 that can be disposed on an annular tubular projection that extends axially away from the thrust surface 70.

The bearing 26 can be received between the inner and outer bearing surfaces 46 and 66 and can be configured to rotatably support the output member 22 for rotation on (and relative to) the input hub 20. In the particular example provided, the bearing 26 is a needle bearing 76 having a plurality of relatively small diameter rollers 78, but it will be appreciated that various other types of bearings could be employed, including ball bearings and bushings.

The one-way clutch 28 can be configured to transmit rotary power from the input hub 20 to the output member 22 in a predetermined rotational direction. The one-way clutch 28 can comprise a clutch input member 80, a spring system 82, a carrier 84, a clutch spring 86, and a clutch output structure 88 having a clutch surface 90. The clutch input member 80 can comprise a body 94, which can be non-rotatably coupled to the clutch mount 48 on the input hub 20, and one or more input drivers 96 that can be configured to transmit rotary power into the spring system 82. In the particular example provided, the body 94 of the clutch input member 80 defines an aperture 98 that is sized to engage the clutch mount 48 on the input hub 20 in an interference fit, but it will be appreciated that various other coupling means can be employed to non-rotatably couple the clutch input member 80 to the input hub 20, including fasteners and welds, in addition to or in lieu of the interference fit that is employed in the present example.

The spring system 82, the carrier 84 and the clutch spring 86 can be configured in a manner that is similar to the configuration of the arcuate springs, the carrier and the wrap spring that are disclosed in International Patent Application No. PCT/CA2010/000296 (W.I.P.O. Publication No. WO 2020/099605), the disclosure of which is hereby incorporated by reference as if fully set forth in detail herein.

The carrier 84 can comprise a carrier member 100, a pair of reaction blocks 102 (only one is shown), and a pair of bumpers 104 (only one is shown). The carrier member 100 can be formed from metal and can have a generally toric exterior surface, a generally toric interior surface, and a pair of annular walls disposed on opposite axial sides of the carrier member 100. If desired, the carrier member 100 can be heat treated and/or coated with a wear-resistant coating or finish. In the particular example provided, the carrier member 100 is heat treated and nitrided, but it will be appreciated that a lubricious coating or material could be applied to all or a portion of the carrier member 100, such as one the generally toric interior surface. Examples of suitable coatings include nickel plating and polytetrafluoroethylene (e.g., Teflon®) and examples of suitable materials include nylon. In instances where a grease or an oil are employed to lubricate the generally toric interior surface, various apertures (not shown) could be formed through the carrier member 100 to facilitate the flow of lubricant into the interior of the carrier member 100. While the carrier member 100 has been described as being unitarily formed, it will be appreciated that the carrier member 100 could be formed by two or more components. For example, the carrier member 100 could be generally formed by two half shells, which could be fabricated in a progressive die from sheet metal, and that the half shells could be fixedly coupled together in an appropriate process, such as welding (e.g., laser welding, friction welding). The reaction blocks 102 can be formed of steel and can be fixedly coupled to the carrier member 100. The reaction blocks 102 can comprise a first end surface and a second end surface. A first one of the reaction blocks 102 can define a spring groove (not shown) that can terminate at the abutment surface. The bumpers 104 can be configured to abut the second end surface on an associated one of the reaction blocks 102.

The spring system 82 can comprise a pair of arcuate springs 104 (only one shown). Each arcuate spring 104 can be a helical coil spring, such as a helical coil compression spring. A first end of the arcuate springs 104 can be engaged to a driving surface 108 of an associated input driver 96 formed on the clutch input member 80, while an opposite end of the arcuate springs 104 can be abutted against the first end surface of an associated one of the reaction blocks 102. It will be appreciated that the arcuate springs 104 can abut the generally toric interior surface of the carrier member 100 and that if desired, a lubricant, such as an oil (e.g., conventional oil, synthetic oil, traction fluid) or a grease, can be employed to lubricate the generally toric interior surface. Additionally or alternatively, a coating or material may be applied to one or both of the generally toric interior surface—and the coils of the arcuate springs 104 to reduce friction and wear between the generally toric interior surface and the arcuate springs 104.

The clutch spring 86 can comprise a proximal end (not specifically shown) and a plurality of helical coils 120. The clutch spring 86 can be formed of a suitable material, such as a relatively hard spring steel wire, and can have an appropriate cross-sectional shape, such as a generally square or generally rectangular cross-sectional shape, in which the surfaces of the cross-sectional shape are generally flat or somewhat convex in shape. It will be appreciated, however, that the wire of the clutch spring 86 could have any desired cross-sectional shape, including a round cross-sectional shape. Moreover, the wire could be a "plain" wire, or could be coated with a desired coating (e.g., nickel plating) and/or can be lubricated with a desired lubricant, such as an oil (including conventional oils, synthetic oils and traction fluids) or a grease. The proximal end can be shaped in a manner that is complementary to the shape of the spring groove in the first one of the reaction blocks 102. The proximal end can be received into the spring groove such that an end face of the wire that forms the clutch spring 86 abuts an abutment surface in the first one of the reaction blocks 102. For example, the proximal end can be press-fit into the spring groove. In the particular example provided, the abutment surface is flat so as to contact the end face over its entirety, but those of skill in the art will appreciate that the abutment surface and/or the end face may be constructed differently. The helical coils 120 can extend about the diameter of the carrier 84 and can be sized larger in diameter than the carrier member 100 (i.e., such that the helical coils 120 do not directly contact the carrier member 100). The clutch surface 90 can be sized to engage the helical coils 120 of the clutch spring 86 in an interference fit. The clutch surface 90 can be heat-treated if desired and/or coated with a suitable coating. In the particular example provided, the clutch surface 90 is hardened and nitrided.

In the particular example provided, the needle bearing 76 is disposed radially in-line with the clutch surface 90 and the helical coils 120 of the clutch spring 86. It will be appreciated, however, that the needle bearing 76 could be shifted relative to the particular configuration that is described above and illustrated in the accompanying drawings.

The torsional vibration damper 30 can be mounted on the damper mount 50 such that the torsional vibration damper 30 rotates with the input hub 20. The torsional vibration damper 30 can employ any desired means for damping torsional vibration, including damping means that employ viscous sheer forces, tangential spring forces and/or friction forces. The torsional vibration damper can be configured to dampen torsional vibration at a frequency above 300 Hz.

In the example provided, the torsional vibration damper 30 comprises an inertia ring 150 and a bushing assembly 152. The bushing assembly 152 can comprise a pair of bushing shells 160, each of which having a collar portion 162 and a flange portion 164. The collar portion 162 can be generally tubular in shape and can be received radially between the inertia ring 150 and the damper mount 50 to aid in supporting the inertia ring 150. The collar portions 162 can be non-rotatably coupled to the damper mount 50 in any desired manner, such as via an interference fit and/or through mating splines or teeth (not shown). Each flange portion 164 can extend radially from an axial end of an associated one of the collar portions 162 and can abut and frictionally engage a portion of an axial end surface of the inertia ring 150. Because bushing shells 160 are non-rotatably coupled to the input hub 20, and because the flange portions 164 frictionally engage the axial end surfaces of the inertia ring 150, rotational energy can be transmitted between the input hub 20 and the inertia ring 150. This permits, for example, rotational energy to be transmitted from the input hub 20 to the inertia ring 150 to initiate rotation of the inertia ring 150, and for the inertia ring 150 to transmit rotational energy to the input hub 20 to dampen torsional vibration. It may be desirable in some instance to bias one or both of the flange portions 164 into contact with the axial end surface(s) of the inertia ring 150. For example, one or both of the flange portions 164 could be formed with a dish-shaped contour to provide spring-like properties that ensure frictional engagement of the flange portion(s) 164 with the inertia ring 150 over a predetermined range of wear. Alternatively, a spring element could be employed in the torsional vibration damper 30 to maintain frictional engagement between the flange portions 164 and the inertia ring 150. In the particular example provided, the cover 24 can be contoured in a manner such that the thrust surface 70 is biased axially inwardly toward the flange portion 164 to push the flange portion 164 into engagement with the inertia ring 150. It will be appreciated, however, that one or more spring elements, such as a compression spring or a Belleville spring washer, could be employed to bias the flange portion 164 into engagement with the inertia ring 150.

The seal system 32 can comprise one or more seals that cooperate to seal an internal cavity 170 in which at least the one-way clutch 28 is disposed. In the particular example provided, the seal system 32 comprises a first seal 174 and a second seal 176. The first seal 174 can be mounted to the first inner seal surface 52 and the first outer seal surface 64 to close a first axial end of the internal cavity 170, while the second seal 176 can be mounted to the second inner seal surface 54 and the second outer seal surface 72 to close a second axial end of the internal cavity 170.

In operation, rotation of the driving shaft will cause corresponding rotation of the input hub 20. Since the torsional vibration damper 30 is mounted to the input hub 20 for rotation therewith, the torsional vibration damper 30 will be effective to reduce torsional vibration at a predetermined frequency regardless of the state of the one-way clutch 28. The one-way clutch 28 is normally engaged so that it transmits rotary power from the input hub 20 to the output member 22. In this regard, rotary power is transmitted from the input hub 20 to the clutch input member 80, from the input drivers 96 to the arcuate springs 104 and into the carrier 84. Rotary power is transmitted from the carrier 84 through the axial end face of the wire that forms the proximal end of the clutch spring 86 and is then distributed by the helical coils 120 into clutch output structure 88 via engagement of the helical coils 120 with the clutch surface 90. It will be appreciated that the clutch spring 86 is wound in such a manner as to circumferentially expand as rotary power is transmitted between the helical coils 120 and the clutch output structure 88, which permits the helical coils 120 to fully engage the clutch surface 90.

In instances where the driving shaft decelerates relative to the output member 22 in excess of a predetermined amount, the output member 22 will tend to rotate relative to the clutch input member 80 in the predetermined direction. Because the helical coils 120 are engaged against the clutch surface 90, the helical coils 120 will tend to coil more tightly so as to release the clutch surface 90 to permit the clutch output structure 88 (and the output member 22) to rotate relative to the clutch input member 80 (and the input hub 20).

Figure 4:
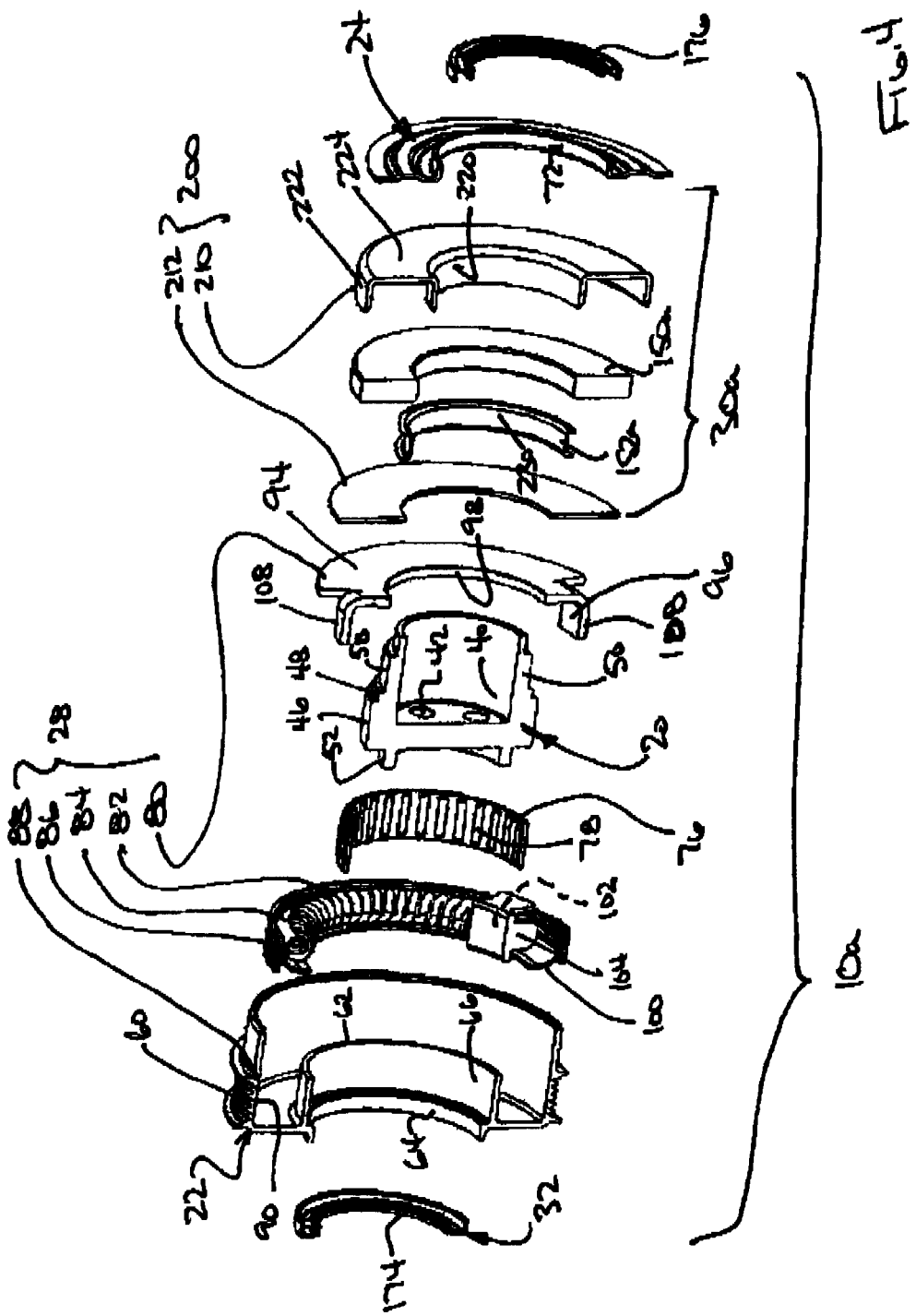
FIG. 4 is an exploded longitudinally sectioned perspective view of a second decoupler assembly constructed in accordance with the teachings of the present disclosure.
Figure 5:
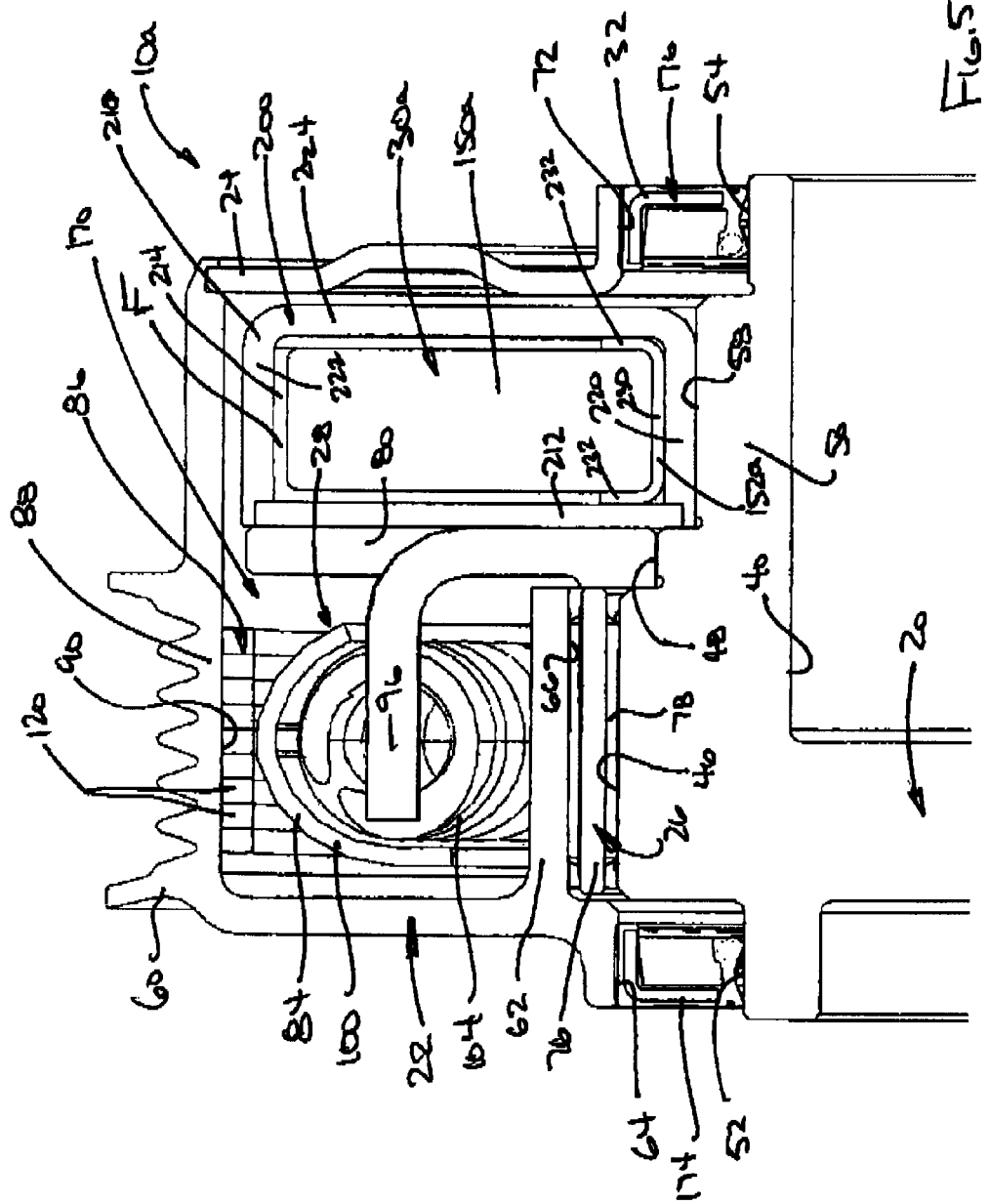
FIG. 5 is a longitudinal section view of a portion of the second decoupler assembly of FIG. 4.

With reference to FIGS. 4 and 5, a second decoupler assembly constructed in accordance with the teachings of the present disclosure is generally indicated by reference numeral 10a. Except as noted herein, the second decoupler assembly 10a can identical to the first decoupler assembly 10 (FIG. 1) and can comprise an input hub 20, an output member 22, a cover 24, a bearing 26, a one-way clutch 28, a torsional vibration damper 30a, and a seal system 32.

The torsional vibration damper 30a can be a fluid-type torsional vibration damper that employs shear forces to dampen torsional vibration. The torsional vibration damper 30a can have a housing assembly 200, a bushing 152a, an inertia ring 150a and a fluid F. The housing assembly 200 can comprise a housing structure 210 and a cover 212 that cooperate to form an annular cavity 214 into which the bushing 152a, the inertia ring 150a and the fluid F are received. The housing structure 210 can comprise a pair of concentric annular walls 220 and 222 and a radially-extending wall 224 that can couple the annular walls 220 and 222 together. The cover 212 can be an annular structure that can be coupled to the annular walls 220 and 222 on a side opposite the radially-extending wall 224. The housing assembly 200 can be coupled to the input hub 20 for rotation therewith. In the example provided, the annular wall 220 is non-rotatably coupled (e.g., via an interference fit and/or weld) to the damper mount surface 58. The bushing 152a can be an annular structure having a tubular body 230, which is received on the annular wall 220, and a pair of radially-extending flanges 232 that extend radially outwardly from opposite axial ends of the tubular body 230. The inertia ring 150a is an annular structure that can be received on the bushing 152a such that the tubular body 230 is disposed between the inertia ring 150a and the annular flange 220 of the housing structure 210, a first one of the radially-extending flanges 232 abuts the cover 212, and the other one of the radially-extending flanges 232 abuts radially-extending wall 224. It will be appreciated that the bushing 152a permits the inertia ring 150a to rotate about the annular wall 220 of the housing structure 210, while simultaneously limiting axial movement of the inertia ring 150a within the housing assembly 200. The fluid F can fill the annular cavity 214 and can be configured to cooperate with the inertia ring 150a to generate shear forces that are suited to dampen torsional vibration at a predetermined frequency. While the particular example provided depicts a fluid-filled torsional vibration damper in which the fluid is segregated from the clutch surface 90, it will be appreciated that in the alternative, the fluid F may be employed to lubricate portions of the one-way clutch 28, including the clutch surface 90.

Figure 6:
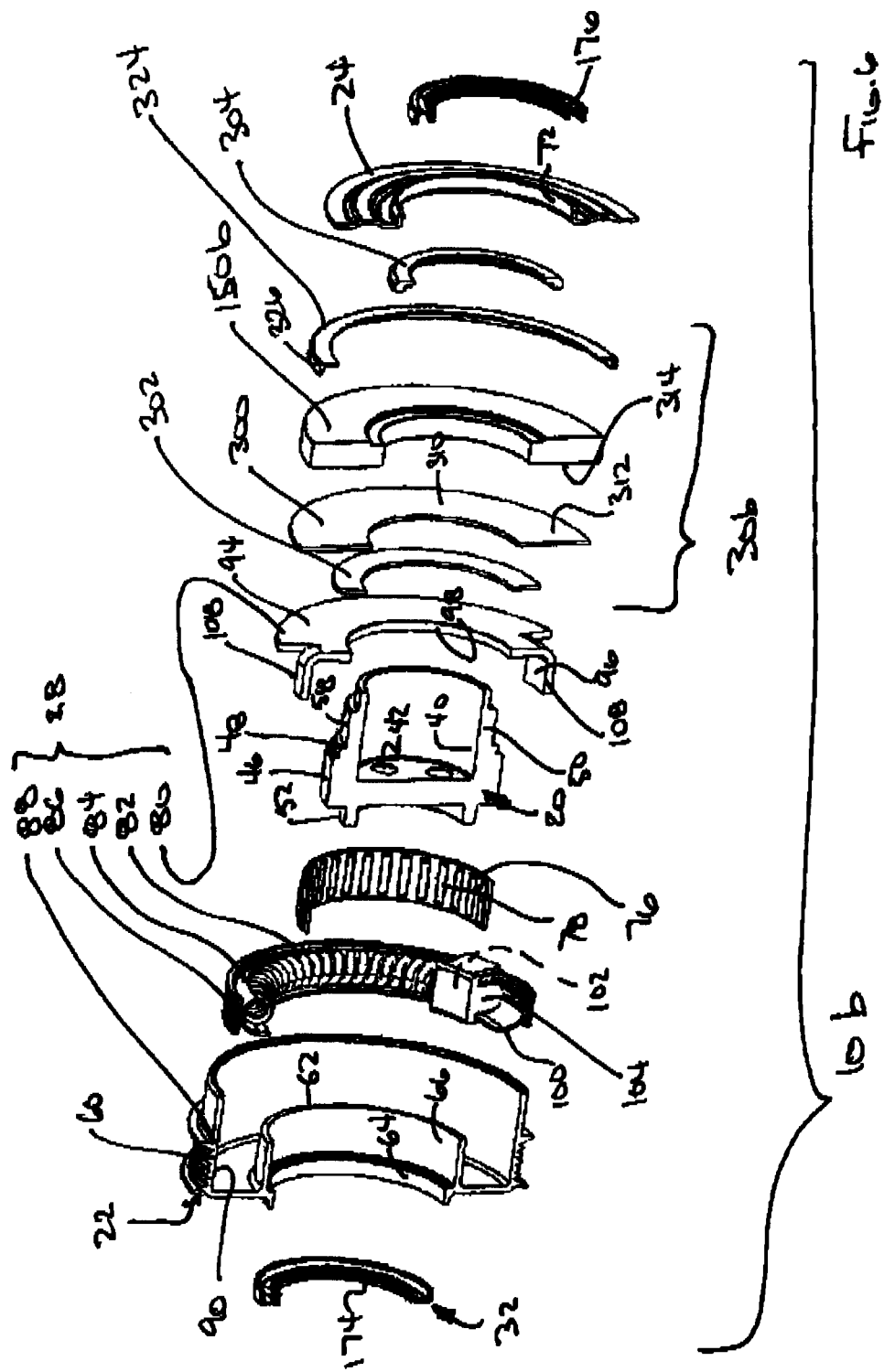
FIG. 6 is an exploded longitudinally sectioned perspective view of a third decoupler assembly constructed in accordance with the teachings of the present disclosure.
Figure 7:
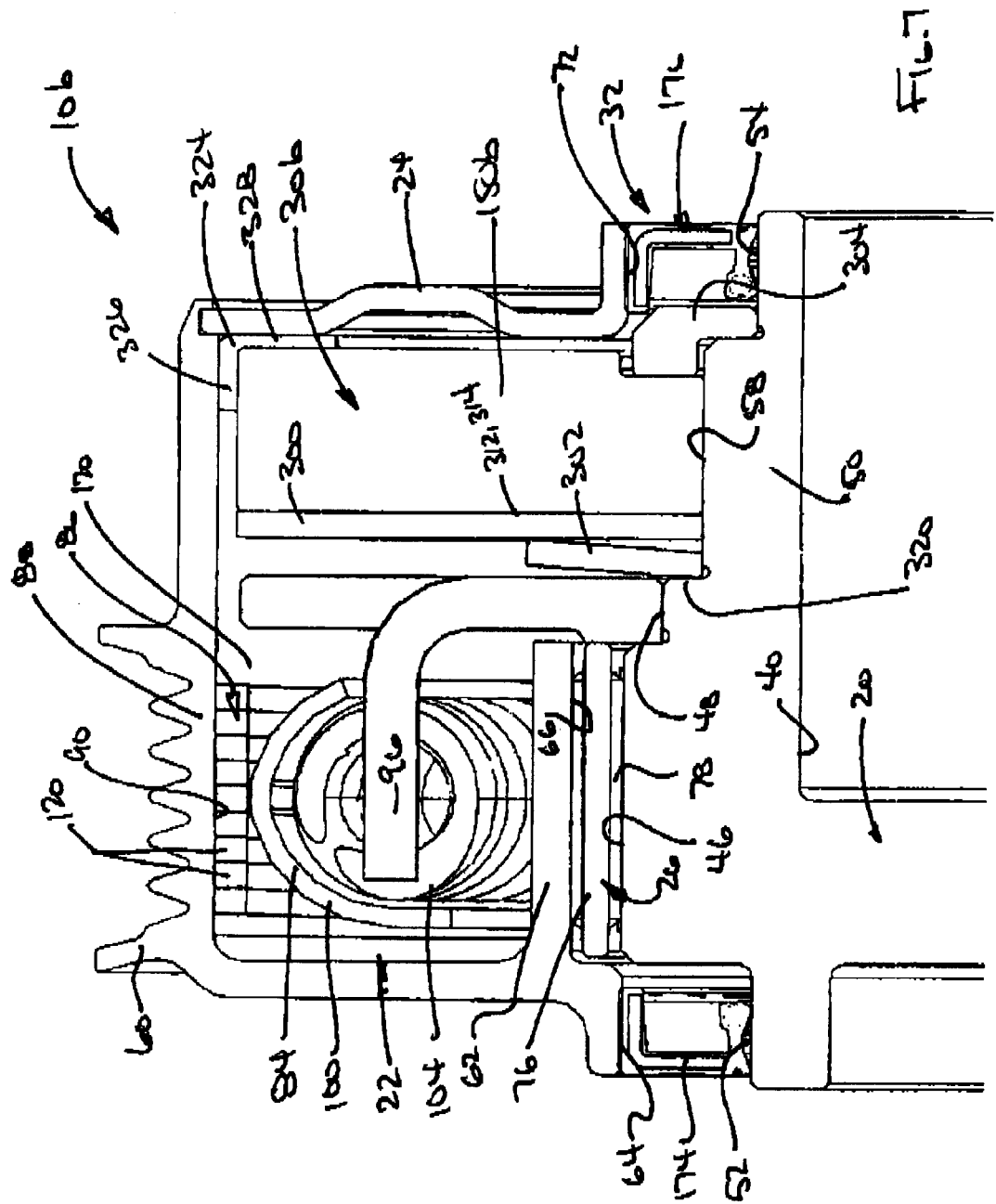
FIG. 7 is a longitudinal section view of a portion of the third decoupler assembly of FIG. 6.

With reference to FIGS. 6 and 7, a third decoupler assembly constructed in accordance with the teachings of the present disclosure is generally indicated by reference numeral 10b. Except as noted herein, the third decoupler assembly 10b can identical to the first decoupler assembly 10 (FIG. 1) and can comprise an input hub 20, an output member 22, a cover 24, a bearing 26, a one-way clutch 28, a torsional vibration damper 30b, and a seal system 32.

The torsional vibration damper 30b can be a friction-type damper that employs frictional forces to dampen torsional vibration. The torsional vibration damper 30 can comprise an inertia ring 150b, a friction plate 300, a spring 302, and a retainer 304. The inertia ring 150b can be an annular structure that can be rotatably mounted on the damper mount surface 58 of the damper mount 50. The friction plate 300 can comprise an annular body 310 that can be non-rotatably but axially-slidably coupled to the input hub 20. The friction plate 300 can comprise a friction material 312 that can be abutted against a radially extending surface 314 of the inertia ring 150b. The spring 302 can be any type of spring that can bias the friction plate 300 into contact with the radially extending surface 314 of the inertia ring 150b. In the particular example provided, the spring 302 is a Belleville spring washer that is disposed against the friction plate 300 and the shoulder 320 between the clutch mount 48 and the damper mount 50. The retainer 304 can be coupled to the input hub 20 and can be configured to limit axial movement of the inertia ring 150b in an axial direction away from the friction plate 300. In the example provided, the retainer 304 is engaged to the input hub 20 via an interference fit, but it will be appreciated that other coupling means, including welds, could be employed in the alternative. An auxiliary bushing 324 can be received between the inertia ring 150b and the output member 22 and/or the cover 24. In the particular example provided, the auxiliary bushing 324 has a circumferentially-extending portion 326, which abuts an outside circumferential surface of the inertia ring 150b and the output member 22, and a radially-extending portion 328 that abuts an axial end of the inertia ring 150b and the cover 24.

Figure 8:
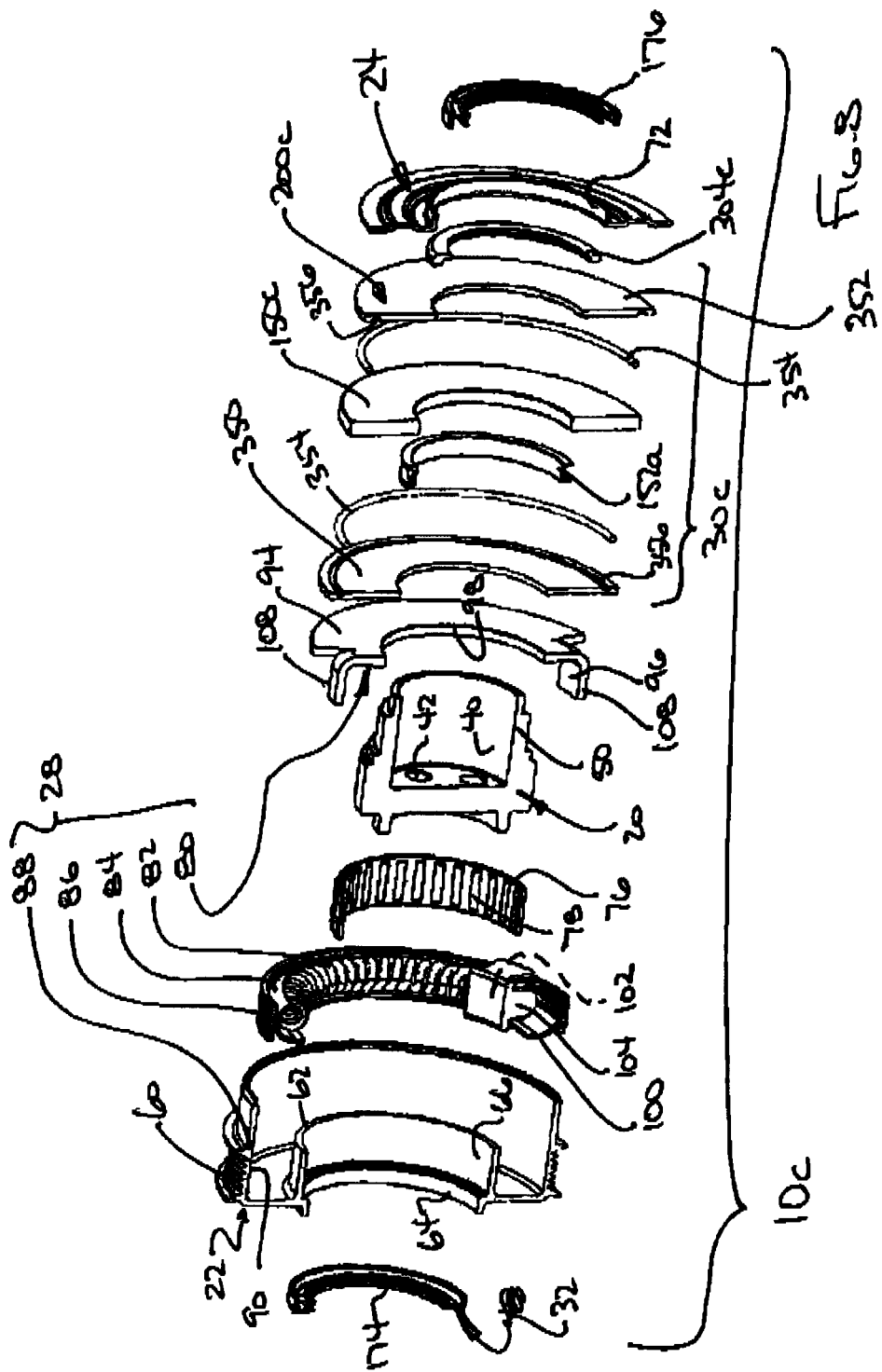
FIG. 8 is an exploded longitudinally sectioned perspective view of a fourth decoupler assembly constructed in accordance with the teachings of the present disclosure.
Figure 9:
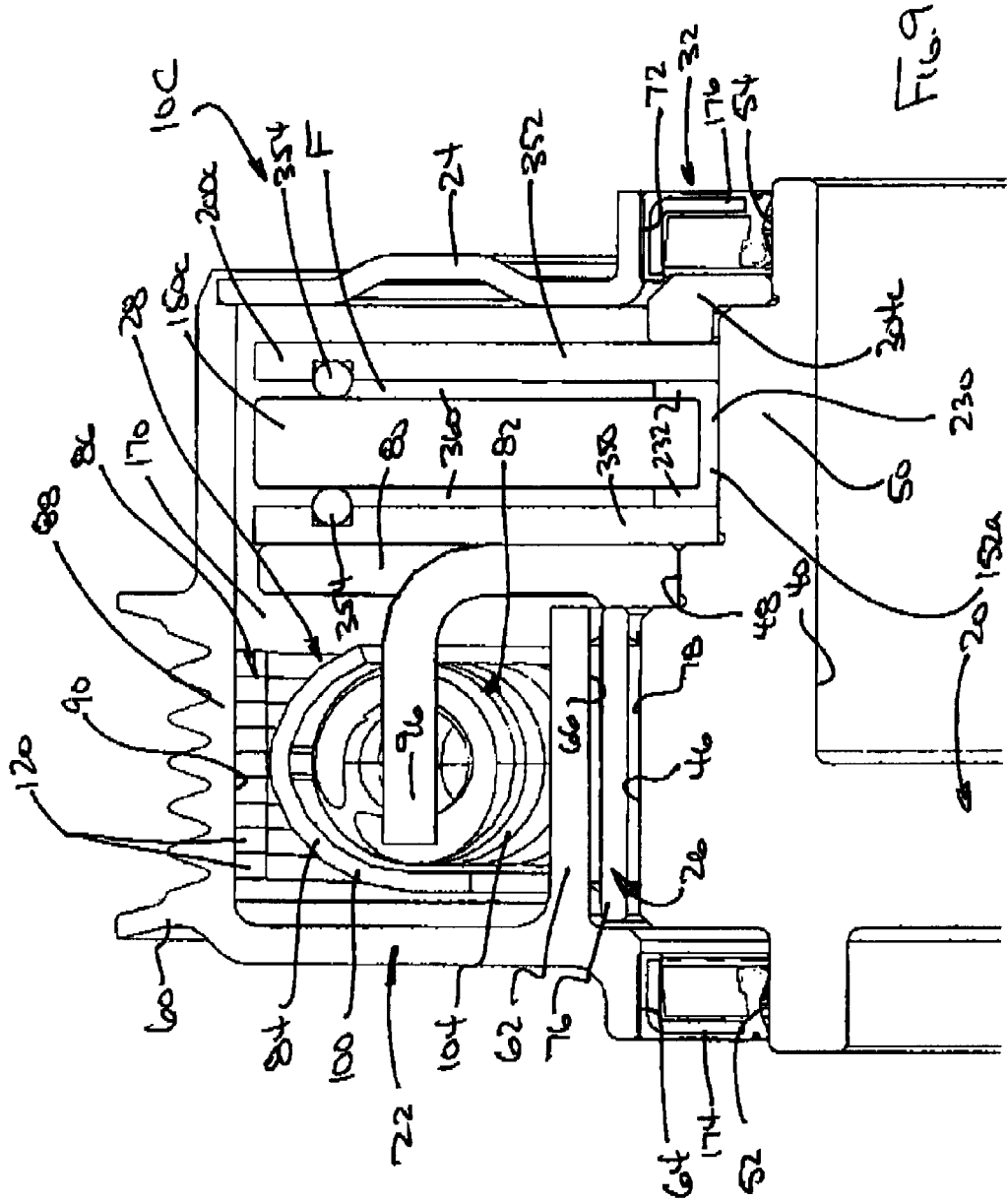
FIG. 9 is a longitudinal section view of a portion of the fourth decoupler assembly of FIG. 8.

With reference to FIGS. 8 and 9, a fourth decoupler assembly constructed in accordance with the teachings of the present disclosure is generally indicated by reference numeral 10c. Except as noted herein, the fourth decoupler assembly 10c can identical to the second decoupler assembly 10a (FIG. 4) and can comprise an input hub 20, an output member 22, a cover 24, a bearing 26, a one-way clutch 28, a torsional vibration damper 30c, and a seal system 32.

The torsional vibration damper 30c can be a fluid-type torsional vibration damper that employs shear forces to dampen torsional vibration. The torsional vibration damper 30c can have a housing assembly 200c, a bushing 152a, an inertia ring 150c, a fluid F and a retainer 304c. The housing assembly 200c can comprise front and rear annular plate members 350 and 352, respectively, which can be fixedly coupled to the damper mount surface 58 of the damper mount 50 to thereby rotate with the input hub 20, and seal members 354 that can be received into seal grooves 356 formed in the front and rear annular plate members 350 and 352. The inertia ring 150c can be an annular structure that can be received on the bushing 152a such that the tubular body 230 is disposed between the inertia ring 150c and the front and rear annular plate members 350 and 352 of the housing assembly 200c. The seal members 354 can sealingly engage opposite axial end faces of the inertia ring 150c. The fluid F can fill the annular cavities 360 that are disposed between the inertia ring 150c and the front and rear annular plate members 350 and 352. The retainer 304c can be coupled to the input hub 20 and can be configured to limit axial movement of the rear annular plate member 352 in an axial direction away from the inertia ring 150c. In the example provided, the retainer 304c is engaged to the input hub 20 via an interference fit, but it will be appreciated that other coupling means, including welds, could be employed in the alternative.

Figure 10:
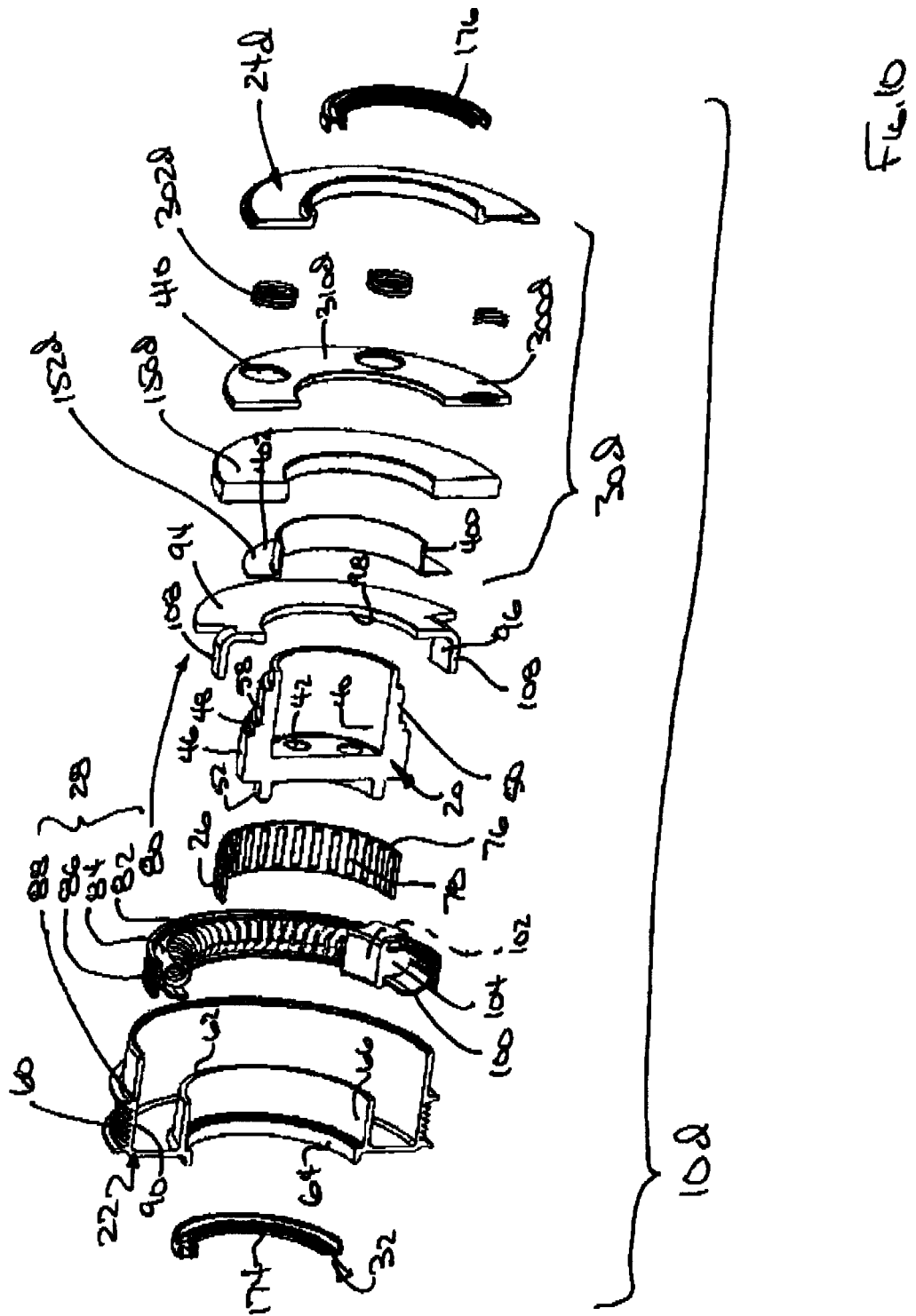
FIG. 10 is an exploded longitudinally sectioned perspective view of a fifth decoupler assembly constructed in accordance with the teachings of the present disclosure.
Figure 11:
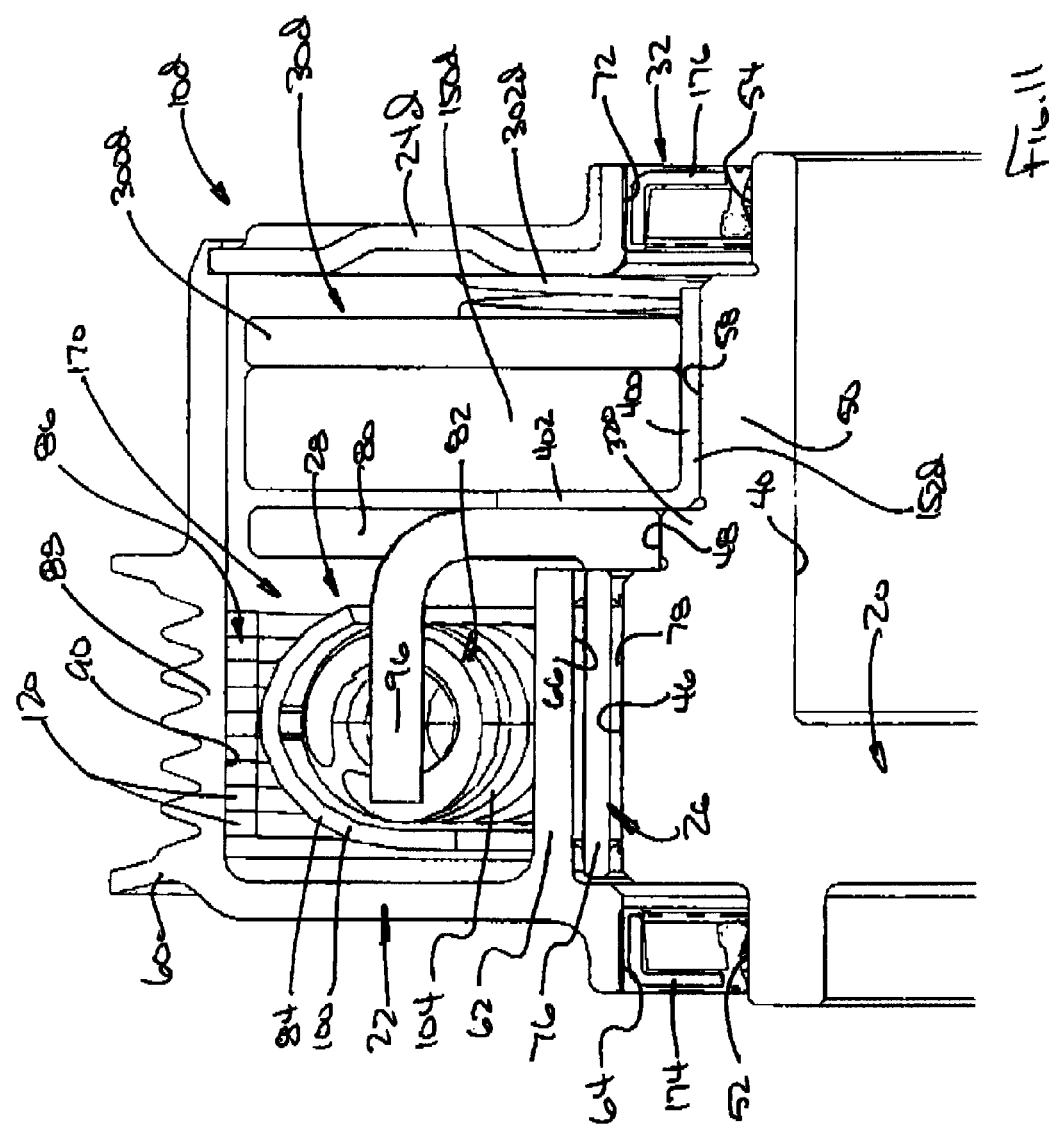

With reference to FIGS. 10 and 11, a fifth decoupler assembly constructed in accordance with the teachings of the present disclosure is generally indicated by reference numeral 10d. Except as noted herein, the fifth decoupler assembly 10b can identical to the third decoupler assembly 10b (FIG. 7) and can comprise an input hub 20, an output member 22, a cover 24d, a bearing 26, a one-way clutch 28, a torsional vibration damper 30d, and a seal system 32.

The torsional vibration damper 30d can be a friction-type damper that employs frictional forces to dampen torsional vibration. The torsional vibration damper 30 can comprise an inertia ring 150d, a friction plate 300d, at least one spring 302d, and a bearing 152d. The bearing 152d can have a tubular body portion 400 and a flange portion 402 that can extend radially from one end of the tubular body portion 400. The tubular body portion 400 can be received on the damper mount 50, while the flange portion 402 can be abutted against the shoulder 320 between the clutch mount 48 and the damper mount 50. The inertia ring 150d can be an annular structure that can be rotatably mounted on the tubular body portion 400 and abutted axially against the flange portion 402. The friction plate 300d can comprise an annular body 310d that can be rotatably and axially movably mounted on the tubular body portion 400 of the bearing 152d. The at least one spring 302d can comprise one or more springs that can bias the friction plate 300d into contact with the inertia ring 150d. In the particular example provided, the at least one spring 302d comprises a plurality of helical coil springs that are received into spring pockets 410 formed in one or both of the friction plate 300d and the cover 24d.

With reference to FIGS. 12 and 13, a sixth decoupler assembly constructed in accordance with the teachings of the present disclosure is generally indicated by reference numeral 10e. Except as noted herein, the sixth decoupler assembly 10e can identical to the first decoupler assembly 10 (FIG. 1) and can comprise an input hub 20, an output member 22, a cover 24, a bearing 26, a one-way clutch 28, a torsional vibration damper 30e, and a seal system 32.

The torsional vibration damper 30e can be of the type that employs tangential spring forces to dampen torsional vibration at a predetermined frequency. The torsional vibration damper 30e can have a damper input hub 500, a front bushing 502, a rear bushing 504, an inertia ring 150e, and a plurality of damping springs 508. The damper input hub 500 can comprise a tubular hub member 510, a plurality of input lugs 512 and a flange 514. The tubular hub member 510 can be non-rotatably coupled to the damper mount 50 such that rotation of the input hub 20 causes corresponding rotation of the damper input hub 500. In the example provided, the tubular hub member 510 is coupled via an interference fit to the damper mount surface 58, but it will be appreciated that other coupling means, including one or more threaded fasteners and/or welds, may be employed in the alternative. The input lugs 512 can extend radially outwardly from the tubular hub member 510 and can be spaced circumferentially apart from one another. The flange 514 can extend radially outwardly from the tubular hub member 510. If desired, the flange 514 can be fixedly coupled directly to the input lugs 512 to stiffen the input lugs 512. The front bushing 502 can be received over the damper input hub 500 and can abut the flange 514. In the example provided, the front bushing 502 comprises a plurality of radially-extending slots 520, each of which being sized to receive an associated one of the input lugs 512. The rear bushing 604 can comprise a tubular portion 524 and a radially-extending flange portion 526. The tubular portion 524 can be received onto the tubular hub member 510. Slots 530 can be formed in the tubular portion 524 and sized to receive the input lugs 512 therein. The radially-extending flange portion 526 can extend radially outwardly from an end of the tubular portion 524 opposite the front bushing 502. The inertia ring 150e can be an annular structure that can be received on the damper input hub 500 between the front bushing 502 and the radially-extending flange portion 526 of the rear bushing 504. The inertia ring 150e can define a plurality of circumferentially spaced-apart damper lugs 540. Each of the damper lugs 540 can be disposed between a pair of damper recesses 542. The damping springs 508 can be helical compression springs and can be received in associated one of the damper recesses 542 between an associated one of the input lugs 512 and an associated one of the damper lugs 540. It will be appreciated that damping springs 508 are disposed on opposite sides of each damper lug 540.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A decoupler assembly comprising:
an input hub that is rotatable about an axis;
an output member;
a one-way clutch having a clutch input member, a clutch output structure, at least one damping spring, a carrier, and a clutch spring, the clutch input member being coupled to the input hub for rotation therewith, the clutch output structure being coupled to the output member and having a clutch surface, the at least one damping spring abutting the clutch input member and the carrier to transmit rotary power therebetween, the clutch spring being formed of wire, the clutch spring having an end that is fixedly coupled to the carrier and a plurality of helical coils that are configured to engage the clutch surface to transmit rotary power input to the clutch spring from the carrier to the clutch output structure;
an annular bearing mount coupled to at least one of the output member and the clutch output structure; and
a needle bearing received between the input hub and the annular bearing mount;

wherein the needle bearing is disposed radially in-line with the helical coils of the clutch spring and the clutch surface, wherein the needle bearing comprises a plurality of rollers, and wherein in a direction along the axis, each of the rollers extends along the axis beyond opposite axial ends the clutch spring.

2. The decoupler assembly of claim 1, wherein the needle bearing contacts an inner bearing surface formed on the input hub and wherein the inner bearing surface is hardened.

3. The decoupler assembly of claim 1, wherein the needle bearing contacts an outer bearing surface on the annular bearing mount and wherein the outer bearing surface is hardened.

4. The decoupler assembly of claim 1, wherein the at least one damping spring comprises a plurality of arcuate helical coil springs.

5. A decoupler assembly comprising:
an input hub;
an output member;
a one-way clutch having a clutch input member, a clutch output structure, at least one damping spring, a carrier, and a clutch spring, the clutch input member being coupled to the input hub for rotation therewith, the clutch output structure being coupled to the output member and having a clutch surface, the at least one damping spring abutting the clutch input member and the carrier to transmit rotary power therebetween, the clutch spring being formed of wire, the clutch spring having an end that is fixedly coupled to the carrier and a plurality of helical coils that are configured to engage the clutch surface to transmit rotary power input to the clutch spring from the carrier to the clutch output structure;
an annular bearing mount coupled to at least one of the output member and the clutch output structure;
a needle bearing received between the input hub and the annular bearing mount; and
a torsional vibration damper mounted on the input hub for rotation therewith;
wherein the torsional vibration damper is disposed within an internal cavity that is bounded by the output member and a cover that is coupled to the output member.

6. The decoupler of claim 5, wherein the torsional vibration damper includes a viscous fluid.

7. The decoupler of claim 6, wherein the viscous fluid is separated from the clutch surface.

8. The decoupler of claim 5, wherein the torsional vibration damper comprises an inertia member, a friction plate and at least one spring for biasing the friction plate into frictional contact with the inertia member.

9. The decoupler of claim 5, wherein the torsional vibration damper comprises an inertia member and a plurality of springs that are disposed between the inertia member and the input hub such that the inertia member is mounted in a torsionally resilient manner to the input hub.

10. The decoupler of claim 5, wherein the torsional vibration damper is configured to dampen torsional vibration at a frequency above 300 Hz.

11. A decoupler assembly comprising:
an input hub;
an output member rotatably mounted on the input hub;
a one-way clutch having a clutch input member, a clutch output structure, at least one damping spring, a carrier, and a clutch spring, the clutch input member being coupled to the input hub for rotation therewith, the clutch output structure being coupled to the output member and having a clutch surface, the at least one damping spring abutting the clutch input member and the carrier to transmit rotary power therebetween, the clutch spring being formed of wire, the clutch spring having an end that is fixedly coupled to the carrier and a plurality of helical coils that are configured to engage the clutch surface to transmit rotary power input to the clutch spring from the carrier to the clutch output structure; and
a torsional vibration damper mounted on the input hub for rotation therewith, the torsional vibration damper being disposed within an internal cavity that is bounded on opposite axial ends by the output member and a cover that is coupled to the output member.

12. The decoupler of claim 11, wherein the torsional vibration damper includes a viscous fluid.

13. The decoupler of claim 12, wherein the viscous fluid lubricates the clutch surface.

14. The decoupler of claim 11, wherein the torsional vibration damper comprises an inertia member, a friction plate and at least one spring for biasing the friction plate into frictional contact with the inertia member.

15. The decoupler of claim 11, wherein the torsional vibration damper comprises an inertia member and a plurality of springs that are disposed between the inertia member and the input hub such that the inertia member is mounted in a torsionally resilient manner to the input hub.

16. The decoupler of claim 11, wherein the torsional vibration damper is configured to dampen torsional vibration at a frequency above 300 Hz.

* * * * *